(12) United States Patent
Niwa et al.

(10) Patent No.: US 8,979,104 B2
(45) Date of Patent: Mar. 17, 2015

(54) FRONT BODY STRUCTURE

(75) Inventors: Toshiyuki Niwa, Tokyo (JP); Masayoshi Suehiro, Tokyo (JP); Atsushi Seto, Tokyo (JP); Takeshi Kawachi, Tokyo (JP); Masaaki Mizumura, Tokyo (JP); Seiichi Daimaru, Tokyo (JP); Kaoru Kawasaki, Tokyo (JP); Hatsuhiko Oikawa, Tokyo (JP); Yasunobu Miyazaki, Tokyo (JP); Tatsuya Sakiyama, Tokyo (JP); Nobutaka Shimizu, Tokyo (JP); Naoki Yoshinaga, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 14/004,702

(22) PCT Filed: Mar. 8, 2012

(86) PCT No.: PCT/JP2012/056014
§ 371 (c)(1),
(2), (4) Date: Nov. 5, 2013

(87) PCT Pub. No.: WO2012/124610
PCT Pub. Date: Sep. 20, 2012

(65) Prior Publication Data
US 2014/0054872 A1 Feb. 27, 2014

(30) Foreign Application Priority Data

Mar. 14, 2011 (JP) ................................. 2011-055241

(51) Int. Cl.
*B62D 25/08* (2006.01)
*B62D 25/02* (2006.01)

(52) U.S. Cl.
CPC ............ *B62D 25/088* (2013.01); *B62D 25/025* (2013.01); *B62D 25/082* (2013.01)
USPC ................................ 280/124.145; 296/203.02

(58) Field of Classification Search
CPC .. B62D 25/025; B62D 25/088; B62D 25/082; B62D 25/085

USPC .................. 280/124.145, 124.135, 124.154; 296/203.02, 193.09
See application file for complete search history.

(56) References Cited

U.S. PATENT DOCUMENTS

| 4,919,474 A | 4/1990 | Adachi et al. |
| 5,346,276 A | 9/1994 | Enning et al. |

(Continued)

FOREIGN PATENT DOCUMENTS

| EP | 1270300 | 1/2003 |
| JP | 1-80576 | 5/1989 |

(Continued)

OTHER PUBLICATIONS

International Search Report dated Apr. 17, 2012 issued in corresponding PCT Application No. PCT/JP2012/056014.

(Continued)

*Primary Examiner* — Drew Brown
(74) *Attorney, Agent, or Firm* — Kenyon & Kenyon LLP (57) ABSTRACT

A structure (10) for a front section of a vehicle body in a vehicle body (1) comprising a front chamber (3) disposed on the forward side of a vehicle interior (2) is provided with the following: a pair of front side members (11), located within the front chamber, that extend in the longitudinal direction of the vehicle body; a pair of strut towers (16) disposed on either side in the width direction of the front chamber and within which front wheel suspensions are disposed; and reinforcement members (20) that link the top of each strut tower with the front side members that face the strut towers, and that extend between the strut towers and the front side members. This configuration allows a structure for a front section of a vehicle body to be provided that can efficiently improve the rigidity of the vehicle body of an automobile against torsion and against lateral bending, and that can efficiently reduce the weight of the vehicle body by means of thickness reduction using a high-strength steel plate.

3 Claims, 9 Drawing Sheets

(56) References Cited

U.S. PATENT DOCUMENTS

| | | | |
|---|---|---|---|
| 7,770,964 B2* | 8/2010 | Herntier et al. | 296/193.01 |
| 7,854,473 B2* | 12/2010 | Kuroita et al. | 296/203.02 |
| 8,128,160 B2* | 3/2012 | Leanza et al. | 296/203.02 |
| 8,448,966 B2* | 5/2013 | Rawlinson et al. | 280/124.155 |
| 2007/0215402 A1 | 9/2007 | Sasaki et al. | |
| 2013/0093217 A1* | 4/2013 | Mildner et al. | 296/203.04 |
| 2013/0161978 A1* | 6/2013 | Herntier et al. | 296/193.09 |

FOREIGN PATENT DOCUMENTS

| | | |
|---|---|---|
| JP | 02-293277 | 12/1990 |
| JP | 07-025360 | 1/1995 |
| JP | 07-25360 | 1/1995 |
| JP | 08-175426 | 7/1996 |
| JP | 09-071267 | 3/1997 |
| JP | 2000-85626 | 3/2000 |
| JP | 2000-085626 | 3/2000 |
| JP | 2001-130450 | 5/2001 |
| JP | 2007-50774 | 3/2007 |
| JP | 2007-050774 | 3/2007 |
| JP | 2007-131028 | 5/2007 |
| JP | 2009-040127 | 2/2009 |
| JP | 2009-078575 | 4/2009 |
| JP | 2010-155559 | 7/2010 |

OTHER PUBLICATIONS

Izhardakar: "Desert Warrior", Dec. 9, 2007; URL:http://izhardakar.files.wordpress.com/2007/12/june-2007-255.jpg.

* cited by examiner

FRONT BODY STRUCTURE

This application is a national stage application of International Application No. PCT/JP2012/056014, filed Mar. 8, 2012, which claims priority to Japanese Application No. 2011-055241, filed Mar. 14, 2011, the content of which is incorporated by reference in its entirety.

TECHNICAL FIELD

This invention relates to a front body structure for improving the stiffness of an automobile body.

BACKGROUND ART

As is well known, to improve the fuel efficiency or the driving performance of automobiles or to absorb the increase in weight accompanying safety measures or fuller options, reduction of the weight of automobiles is being sought. For this reason, for example, high strength steel plate is being used to reduce the thickness of the body structure and thereby lighten the weight of the body.

For example, when using 590 MPa class high strength steel plate to lighten the body, it is considered possible to secure the body strength while reducing the weight by about 40% compared with conventional steel plate. Very great results have been anticipated.

On the other hand, since an automobile receives force from bumps on the road surface while driving, impact when riding over road shoulders etc., and various other forces, torsional stiffness is required in addition to body strength. However, if using high strength steel plate to reduce the thickness of the body structure, even if the body strength is secured, the torsional stiffness generally falls.

That is, in high strength steel plate, the tensile strength of the steel plate is improved by the temperature history, ingredients, etc., but the Young's modulus of iron is constant and does not change. For this reason, if the body structure is reduced in thickness, the polar moment of inertia of area becomes smaller. As a result, the torsional stiffness falls.

Therefore, when using high strength steel plate etc. to maintain the body strength while reducing the thickness of the body so as to lighten the weight, it is also necessary to improve the torsional stiffness.

Regarding the improvement of the torsional stiffness of the body, as art focusing on the front body structure, for example, art such as shown in PLTs 1 to 4 is disclosed.

Specifically, PLT 1 discloses to form an upper part of a strut tower at one part of a wheel apron reinforcing member which is provided at an upper edge of a wheel apron panel which forms the wheel housing and connects the wheel apron reinforcing member to a subframe which extends in the engine compartment in the vehicle width direction.

PLT 2 discloses a front body structure provided with reinforcing frame members with front ends which are connected to rear parts of front side frames and with rear ends which are connected to side panels at rear parts of strut towers and a dash cross member which is connected to rear parts of the reinforcing frame member sand which extends at the bottom of a cowl part in the width direction.

PLT 3 discloses provision of a dash member at a dash panel which extends at the rear of the engine compartment in the width direction.

PLT 4 discloses to form strut housings as single parts and to join side members, hood ridges, a dash panel, and a cowl top panel to the strut housings to integrally form them together.

CITATIONS LIST

Patent Literature

PLT 1: Japanese Patent Publication No. 2-293277A
PLT 2: Japanese Patent Publication No. 2009-40127A
PLT 3: Japanese Patent Publication No. 2001-130450A
PLT 4: Japanese Patent Publication No. 2009-078575A

SUMMARY OF INVENTION

Technical Problem

However, to promote the reduction of weight through the reduction of the thickness of the body structure, it cannot be said to be sufficient to improve the torsional stiffness of the body by just the reinforcement disclosed in the above PLTs 1 to 4 etc. For this reason, there is a strong demand for art for more effective improvement of the torsional stiffness eyeing future improvements in strength of high strength steel plate.

Further, to secure response at the time of changing a lane or otherwise steering a vehicle which has the above body structure, a front body structure requires lateral (horizontal) bending stiffness. This lateral bending stiffness, like this torsional stiffness, generally falls if using high strength steel plate to reduce the thickness of the body structure. Therefore, in the same way as torsional stiffness, there is a strong demand for art for improvement of the lateral bending stiffness.

The present invention was made in consideration of this situation and has as its object the provision of a front body structure which enables efficient improvement of the torsional stiffness and lateral bending stiffness of the body of an automobile and in turn a front body structure which uses high strength steel plate to reduce the thickness and thereby enable the weight of a body to be efficiently lightened.

Solution to Problem

To solve this problem, the inventors engaged in in-depth studies and as a result obtained the following finding.

By providing reinforcing members joined to the top parts of the strut towers and to the front side members which face the strut towers and extending between these, it is possible to disperse the load which is input to the strut towers.

Using the reinforcing members, it is possible to transmit the load in the vehicle width direction which is applied to the top parts of the strut towers to the front side members which face these strut towers.

The present invention was made based on the above finding, and has as its gist the following.

(1) A front body structure in a body which has a front compartment which is arranged at a front side of a passenger compartment, characterized in comprising: a pair of front side members which are positioned at the inside of the front chamber and extend in a front-rear direction of the body; a pair of strut towers which are arranged inside the front compartment at the both sides of a width direction of the front compartment and at the inside of which suspensions for front wheel are arranged; and a reinforcing member which is connected to the top part of the strut tower and a front side member which faces the strut tower, and which extends between these top part and front side member.

Note that "the top parts of the strut towers" mean parts which are positioned at the top sides when dividing strut towers which extend from the suspension setting parts to the front side members equally into top and bottom parts.

(2) The front body structure as set forth in the above (1) characterized in that the reinforcing member extends along a plane perpendicular to the front-rear direction of the body.

(3) The front body structure as set forth in the above (1) or (2) characterized in that the reinforcing member comprises a first reinforcing member which is connected to a top part of a strut tower of one side in the width direction and a front side member of the other side in the width direction and extends between these top part and front side member and a second reinforcing member which is connected to a top part of a strut tower of the other side in the width direction and a front side member of the one side in the width direction and extends between these top part and front side member.

(4) The front body structure as set forth in any one of the above (1) to (3) characterized in that the reinforcing member is comprised of a solid rod member.

(5) The front body structure as set forth in the above (1) or (2) characterized in that the reinforcing member is a single member which is connected to the top parts of both strut towers and the two front side members.

(6) The front body structure as set forth in the above (5) characterized in that the reinforcing member is a panel member and in that an edge of the panel member in the width direction is connected across the entire length to the strut towers and front side members.

(7) The front body structure as set forth in the above (6) characterized in that the panel member is formed with a reinforcing bead.

Advantageous Effects of Invention

The load which is input from the suspensions to the strut towers is transmitted through the side panels or upper members etc. which form the wheel housings to the body structure as a whole. According to all of the front body structures of the present invention, reinforcing members which are joined to the top parts of the strut towers and the front side members which face the strut towers and extend between the same are provided. By providing such reinforcing members, the load which is input from the suspensions to the strut towers is transmitted through the existing components (side panels and upper members) and also the reinforcing members to the body structure as a whole. For this reason, it is possible to disperse the load which is input to the strut towers to transmit it to the body structure as a whole and as a result it is possible to effectively improve the torsional stiffness of the body of an automobile.

Further, in all of the front body structures according to the present invention, the reinforcing members are joined to the top parts of the strut towers and the front side members which face the strut towers. For this reason, it is possible to transmit the load in the vehicle width direction which is applied to the top parts of the strut towers to the front side members which face the strut towers. As a result, it is possible to effectively improve the lateral bending stiffness at the front of the body.

DESCRIPTION OF EMBODIMENTS

Figure 1:
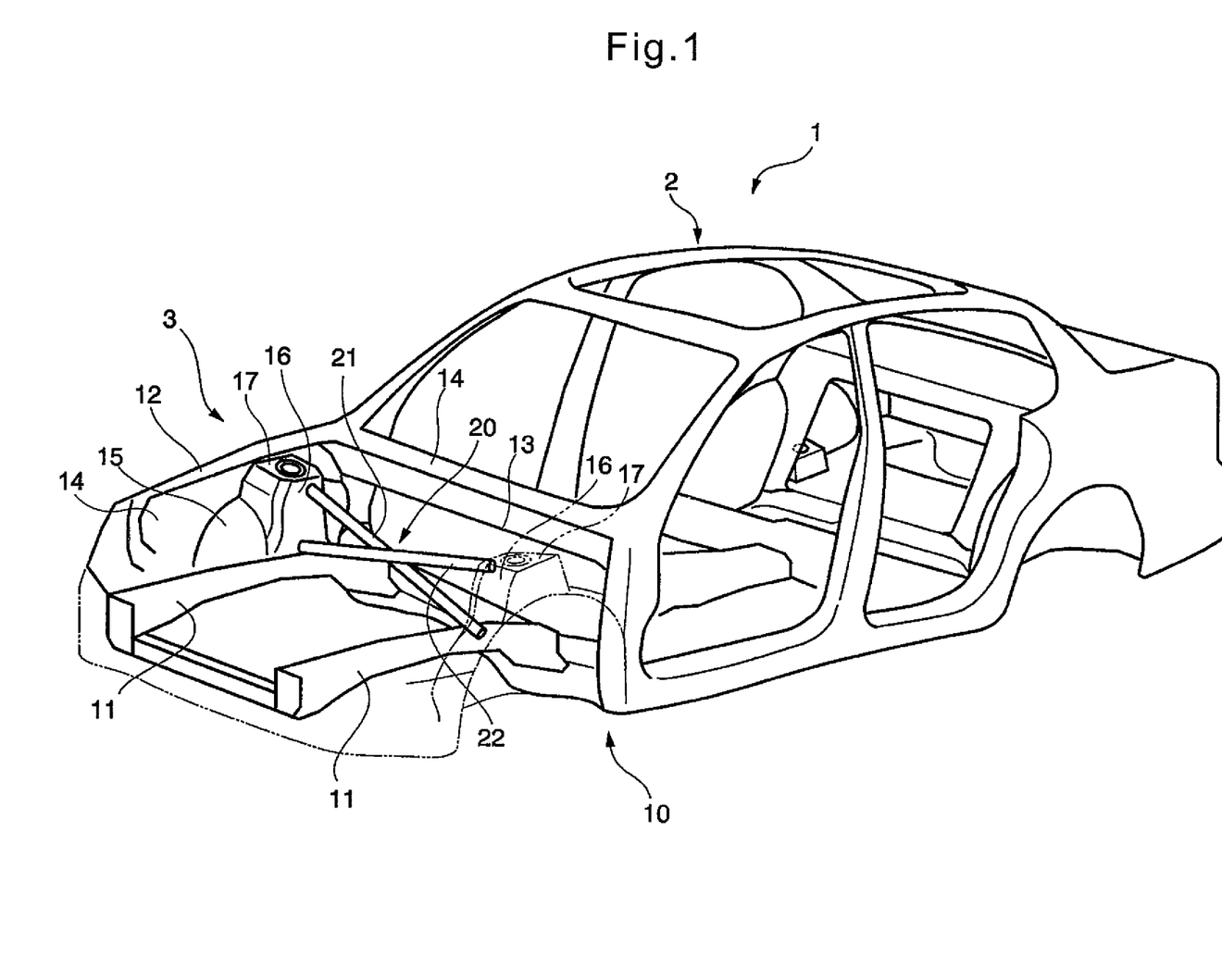
FIG. 1 is a view which shows an outline of the overall structure of a body according to a first embodiment of the present invention.
Figure 2:
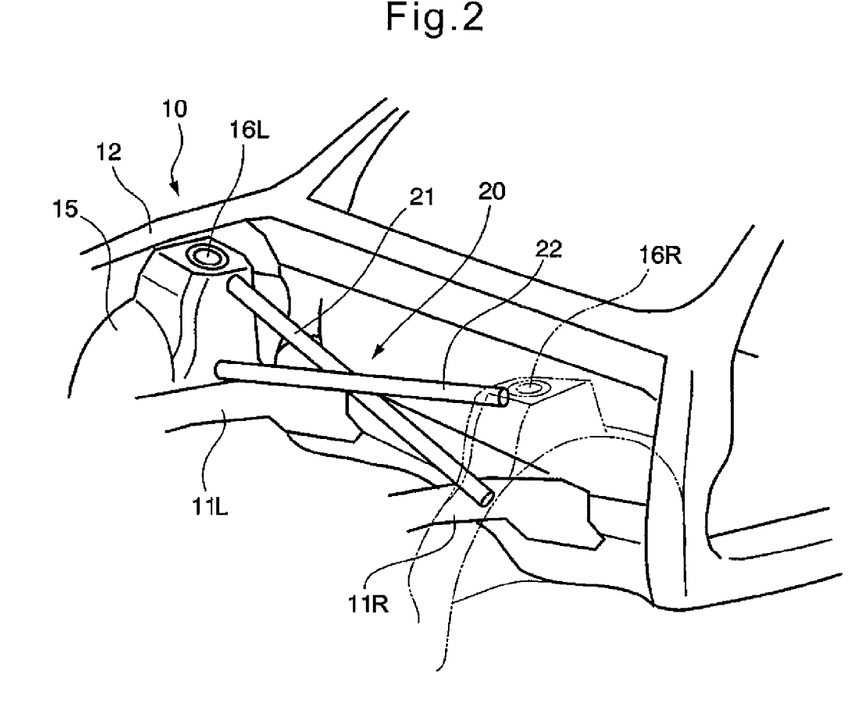
FIG. 2 is a perspective view which shows a front body structure according to the first embodiment.
Figure 3:
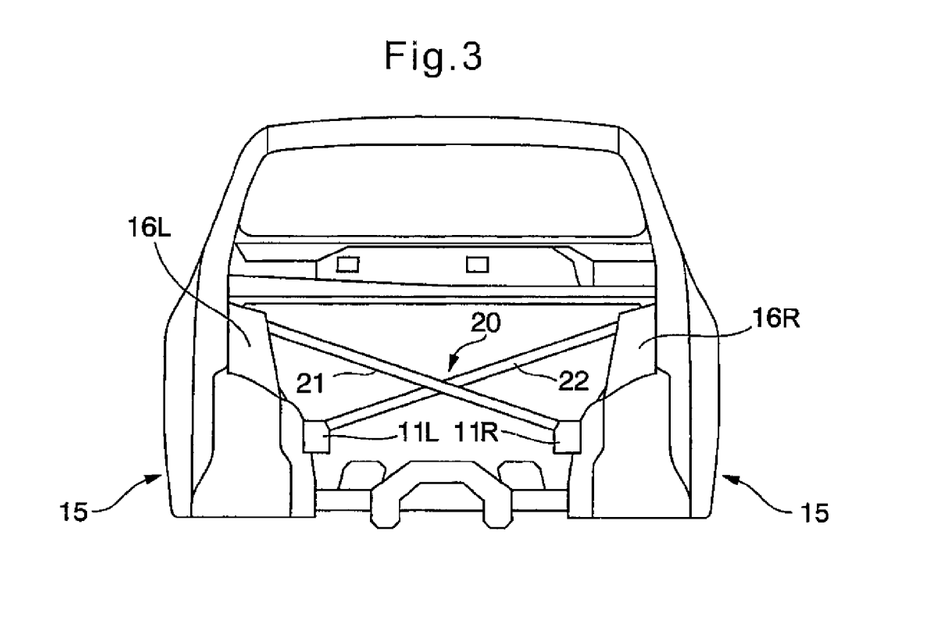
FIG. 3 is a view of the front body structure according to the first embodiment seen from the front.

Below, referring to FIG. 1 to FIG. 3, a first embodiment of the present invention will be explained. FIG. 1 is a view which shows a body 1 which has a front body structure 10 according to a first embodiment of the present invention. The body 1 is provided with a passenger compartment 2 which forms a space which a driver and passengers ride in and a front compartment 3 which is arranged at the front side of the passenger compartment 2 (left side in FIG. 1). In the present embodiment, inside the front compartment 3, an engine or motor or other power unit for driving the wheels is mounted. Further, in the present embodiment, the main material of the body 1 is high strength steel.

The front body structure 10 according to the present embodiment is provided with a pair of front side members 11 which are positioned at the inside of the front compartment 3 (in particular, in the present embodiment, the bottom of the inside of the front chamber 3) and extend in a front-rear direction of the body 1 and a pair of upper members 12 which extend at the top of the two ends of the front compartment 3 in the width direction in the front-rear direction of the body 1. The front body structure 10 is further provided with a dash panel 13 which extends in the width direction of the body 1 and separates the passenger compartment 2 and the front compartment 3 and a pair of side panels 14 which extend from the upper members 12 to the bottom.

The side panels 14 are provided with front wheel houses 15 and strut towers 16. The front wheel houses 15 bulge inward in the width direction of the body 1 and are formed so as to be joined with the front side members 11 at the bottom. The front wheel houses 15 are structured opening outward. At the insides, front wheels (not shown) are arranged.

Further, the strut towers 16 are formed by the front wheel houses 15 and the side panels 17 at the top thereof bulging out to the inside of the body 1 in the width direction. Changing the way of viewing this, the strut towers 16 can be said to be provided to stick out to the top from ceiling parts of the front wheel houses 15. In particular, in the present embodiment, the heights of the top parts of the strut towers 16 are substantially the same as the heights of the upper members 12. Whatever the case, the pair of strut towers 16 are arranged inside of the front compartment 3 at the two sides of the front compartment 3 in the width direction. Further, at the insides of the strut towers 16, suspensions for front wheels (not shown) are arranged. At the suspension setting parts 17 of the strut towers 16, top ends of the suspensions for front wheels are fastened.

In addition, in the present embodiment, reinforcing members 20 which are joined to the top parts of the strut towers 16 and the front side members 11 which face the strut towers 16 and extend between the same are provided. Here, "the top parts of strut towers 16" mean parts which are positioned at the top sides when dividing strut towers which extend from the suspension setting parts 17 to the front side members 11 equally into top and bottom parts.

The reinforcing members 20 will be explained more specifically. Here, as explained above, the front side members 11 and strut towers 16 are arranged at the two sides of the vehicle in the width direction. The ones which are arranged at one side in the width direction (in FIG. 3, left side) are indicated as 11L and 16L, while the ones which are arranged at the other side in the width direction (opposite side in width direction from above one side in width direction, in FIG. 3, the right side) are indicated as 11R and 16R.

The reinforcing members 20 are provided with a first reinforcing member 21 which is connected to a top part of a strut tower 16L of one side in the width direction and a front side member 11R of the other side in the width direction and extends between the same and a second reinforcing member 22 which is connected to a top part of a strut tower 16R of the other side in the width direction and a front side member 11L of the one side in the width direction. In the present embodiment, the first reinforcing member 21 and the second reinforcing member 22 both extend along planes perpendicular to the front-rear direction of the body (vertical planes).

The first reinforcing member 21 and the second reinforcing member 22 are formed by for example substantially cylindrically shaped steel pipes. First ends are joined to the top parts of the strut towers 16, while the other ends are joined to the front side members 11 by welding.

Here, when viewed from the front of the body 1, the first reinforcing member 21 and the second reinforcing member 22 are arranged crossing each other. The intersecting parts of the first reinforcing member 21 and the second reinforcing member 22 are not constrained by each other.

According to the front body structure 10 of the present embodiment which is configured in this way, since the above-mentioned such reinforcing members 20 are provided, the load which is input from the strut towers 16 can be dispersed to the front side members 11 by the first reinforcing member 21 and second reinforcing member 22.

That is, the load which is input from the strut tower 16L of one side in the width direction is transmitted to not only the upper member 12 and the front side member 11L at one side in the width direction, but also through the first reinforcing member 21 to the front side member 11R of the other side in the width direction. Due to this, deformation of the strut tower 16L due to the load is suppressed. In the same way, the load which is input to the strut tower 16R of the other side in the width direction is transmitted not only to the upper member 12 and front side member 11R at the other side in the width direction, but also through the second reinforcing member 22 to the front side member 11L of the one side in the width direction. Due to this, deformation of the strut tower 16R due to the load is suppressed. Due to this, it is possible to improve the torsional stiffness of the body 1 as a whole.

Further, the suspension setting parts 17 of the strut towers 16 are sometimes subjected to load in the vehicle width direction along with turning of the vehicle etc. According to the front body structure 10 of the present embodiment, the load in the vehicle width direction which is input from the strut tower 16L of one side in the width direction is transmitted to not only to the upper member 12 and the front side member 11L of the one side in the width direction, but also through the first reinforcing member 21 to the front side member 11R at the other side in the width direction. Similarly, the load in the vehicle width direction which is input from the strut tower 16R of the other side in the width direction is transmitted to not only to the upper member 12 and the front side member 11R of the other side in the width direction, but also through the second reinforcing member 22 to the front side member 11L at the one side in the width direction. Due to this, it is possible to improve the lateral bending stiffness of the front of the body.

Furthermore, since the first reinforcing member 21 and the second reinforcing member 22 are arranged along planes perpendicular to the front-rear direction of the body 1 (vertical planes), it is possible to efficiently transmit the load which is input from the strut towers 16 to the front side members 11. Due to this, it is possible to suppress the torsional deformation of the front body structure 10 to a higher extent and possible to improve the torsional stiffness of the body 1 as a whole.

Figure 4:
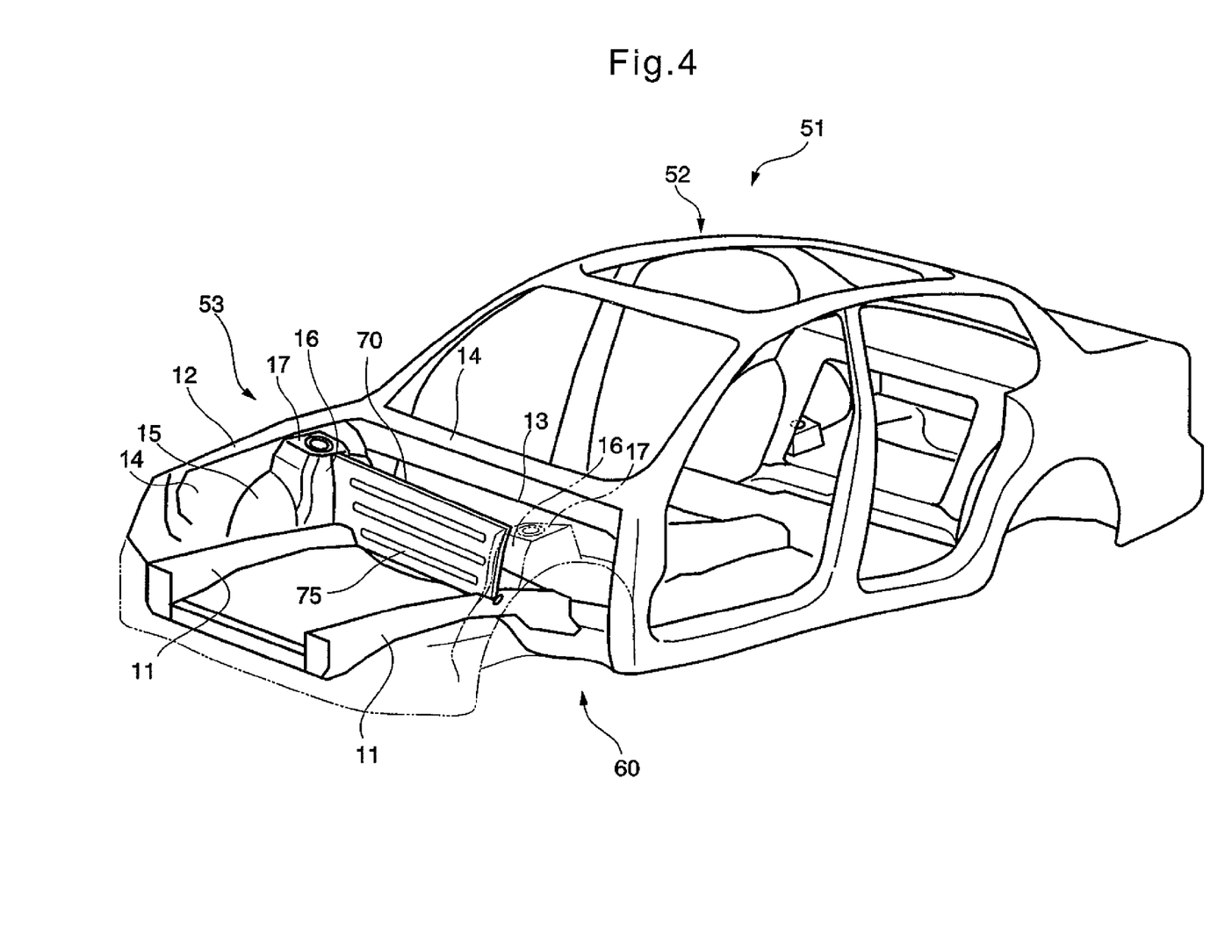
FIG. 4 is a view which shows an outline of the overall structure of a body according to a second embodiment of the present invention.

Next, referring to FIG. 4 and FIG. 5, a second embodiment of the present invention will be explained. FIG. 4 is a view which shows a body 51 which has a front body structure 60 according to a second embodiment of the present invention. Note that members the same as the first embodiment are assigned the same reference notations and detailed descriptions are omitted.

In the front body structure 60 according to the second embodiment, as the reinforcing members, a single panel member 70 which is joined to the pair of front side members 11 and the pair of strut towers 16 is arranged. In particular, in the present embodiment, the edge of the panel member 70 in the width direction is joined across its entire length to the strut towers 16 and front side members 11. Therefore, in the present embodiment, the panel member 70 can be said to be joined to both the top parts and the bottom parts of the strut towers 16.

In more detail, the edge 70L of one side of the panel member 70 in the width direction is joined to the top and bottom of the strut tower 16L of one side in the width direction and to the front side member 11L. Further, the edge 70R of the other side of the panel member 70 in the width direction is joined to the top and bottom of the strut tower 16R of the other side in the width direction and to the front side member 11R. In the present embodiment, the panel member 70 is arranged along the plane perpendicular to the front-rear direction of the body 51 (vertical plane).

The panel member 70 is formed from steel plate. It is joined at its entire length in the width direction edge by laser welding to the strut tower 16 and front side member 11. Further, the panel member 70 is formed with a reinforcing bead 75 for improving the strength of the panel member 70 itself. In the present embodiment, as shown in FIG. 5, a plurality of reinforcing beads 75 are formed extending in the width direction. Further, in the present embodiment, the reinforcing beads 75 are formed by a press and are formed in rectangular cross-sectional shapes with single open sides.

According to the front body structure 60 of the present embodiment configured in this way, since the above-mentioned panel member 70 is provided as the reinforcing members, the load which is input from the strut towers 16 can be dispersed by the panel member 70 to the front side members 11. Accordingly, it is possible to suppress the deformation due the load which is input from the strut towers 16 by the panel member 70. As a result, it is possible to improve the torsional stiffness of the body 51 as a whole. Further, in the same way as the first embodiment, it is possible to improve the lateral bending stiffness at the front of the body as well.

Furthermore, in the present embodiment, since the panel member 70 is arranged along a plane perpendicular to the front-rear direction of the body 51 (vertical plane), the load which is input from the strut towers 16 can be efficiently transmitted to the front side members 11. Due to this, the torsional stiffness of the body 51 as a whole can be further improved.

Further, since the panel member 70 is formed with reinforcing beads 75, the panel member 70 itself can be improved in strength and deformation can be suppressed. Therefore, torsional deformation of the front body structure 60 can be suppressed by a higher extent.

Furthermore, in the present embodiment, the panel member 70 is joined at the entire length of its edge in the width direction by laser welding to the strut towers 16 and front side members 11. For this reason, the joined strength of the panel member 70 to the strut towers 16 and front side members 11 is improved and torsional deformation of the front body structure 60 can be suppressed.

Further, according to the present embodiment, at the time of impact, the parts which are housed in the front chamber 53 can be kept from entering the passenger compartment 52 by the panel member 70.

Embodiments of the present invention were explained, but the present invention is not limited to the above embodiment. Various changes can be made within a scope not deviating from the gist of the invention.

For example, in the above embodiments, the case where the main material of the body was high strength steel was explained, but all or part of the body may also be formed from aluminum, FRP, or another material which can generally be used for a body. Further, high strength steel was used for the reinforcing members, but aluminum, FRP, and other materials may also be used. In addition, the reinforcing beads do not necessarily have to be given cross-sections of rectangular shapes open at one side. They may also be made trapezoidal shapes open at one side or semicircular shapes, semi-oval shapes, and various other shapes.

Further, the first embodiment was explained assuming the first reinforcing member 21 and the second reinforcing member 22 were formed by approximately cylindrically shaped steel pipes, but the invention is not limited to this. For example, the first reinforcing member 21 and the second reinforcing member 22 may be rod members of cross-sectional shapes different from cylindrical shapes such as rectangular shapes. Further, they may also be formed with thicker center sides or formed flaring outward toward the ends.

Furthermore, in the first embodiment, the first reinforcing member 21 and the second reinforcing member 22 are joined by welding to the top parts of the strut towers 16 and the front side members 11, but the joining method is not limited to this. Therefore, as the joining method, it is also possible to employ a system using bolts or rivets etc. for fastening or other methods.

Further, in the first embodiment, the first reinforcing member 21 and the second reinforcing member 22 may also be formed by solid rod members (wires or steel rods etc.) In this case, the space occupied by the first reinforcing member 21 and the second reinforcing member 22 can be kept small. As a result, it is possible effectively utilize the space while improving the torsional stiffness. Here, for example, when a load directed upward is input to one side in the width direction, a tensile force acts on the first reinforcing member 21 which connects the strut tower 16 of one side in the width direction and the front side member 11 of the other side in the width direction, but this tensile force can be received by the first reinforcing member 21 comprised of steel wire and torsional deformation of the body 1 is suppressed.

Furthermore, in the first embodiment, as explained above, the first reinforcing member 21 and the second reinforcing member 22 both extend along planes perpendicular to the front-rear direction of the body. However, they do not necessarily have to extend along the planes. They may also extend along planes inclined with respect to these planes. Further, the planes along which the first reinforcing member 21 and the second reinforcing member 22 extend do not necessarily have to be parallel. The members may also be formed so as to extend on planes which are not parallel with each other. However, these first reinforcing member 21 and second reinforcing member 22 are preferably arranged substantially symmetrically about a plane extending in the front-rear direction of the body at the center of the body in the width direction.

In addition, in the first embodiment, the intersecting parts of the first reinforcing member 21 and the second reinforcing member 22 are formed so as to not be constrained by each other, but these first reinforcing member 21 and second reinforcing member 22 may also be formed so as to be joined and fastened to each other. In this case, the first reinforcing member 21 and the second reinforcing member 22 may be arranged on the same plane. Due to this, the body can be further improved in torsional stiffness.

Figure 5:
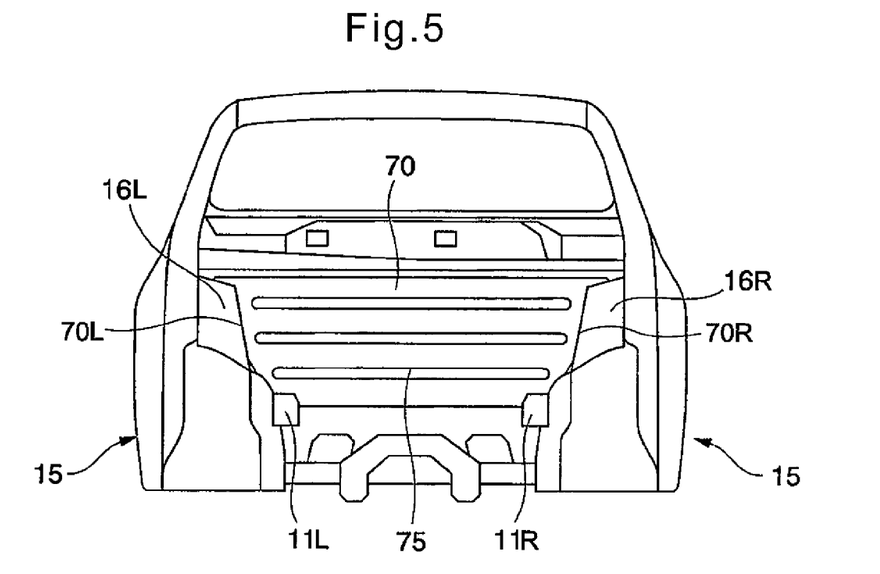
FIG. 5 is a view of the front body structure, seen from the front, according to the second embodiment.
Figure 6:
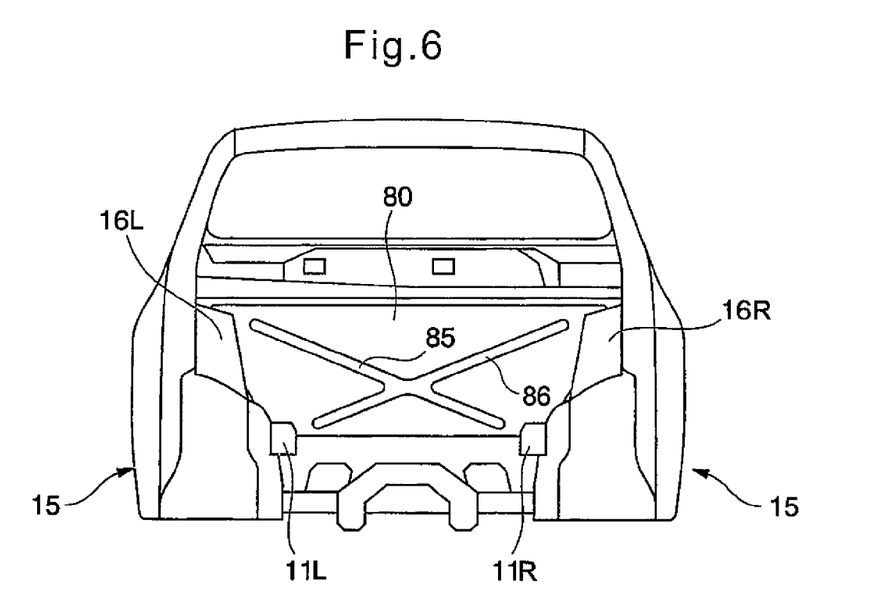
FIG. 6 is a view of the front body structure according to a modification of the second embodiment of the present invention.
Figure 7:
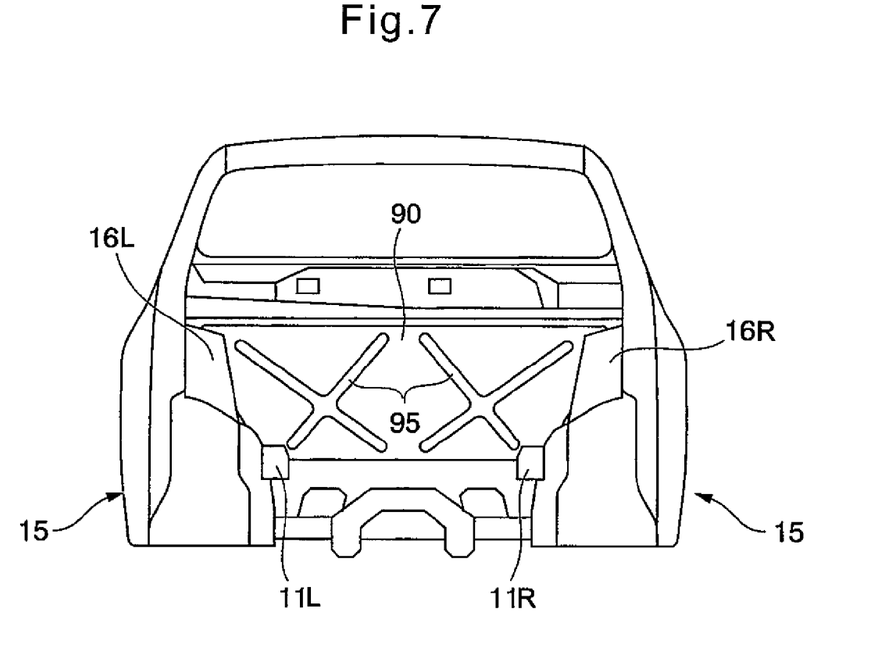
FIG. 7 is a view of the front body structure, seen from the front, according to the second embodiment of the present invention.

Further, in the second embodiment, the explanation was given assuming the panel member 70 was provided with reinforcing beads 75 extending in the width direction, but the shape of the reinforcing beads 75 is not limited to the shape of FIGS. 4 and 5. Therefore, instead of the panel method 70 which is shown in FIGS. 4 and 5, for example, as shown in FIG. 6, it is also possible to use a panel member 80 which is provided with a bead 85 which extends between the top part of the strut tower 16L of one side in the width direction and the front side member 11R at the other side in the width direction and a bead 86 which extends between the top part of the strut tower 16R of the other side in the width direction and the front side member 11L at one side in the width direction. Alternatively, as shown in FIG. 7, a panel member 90 which is provided with a plurality of X-shaped beads 95 in the vehicle width direction may also be used.

Furthermore, in the second embodiment, the explanation was given assuming the panel member 70 was laser welded along the entire length of the edge in the width direction, but the method of joining the panel member 70 is not limited to this. Therefore, as the joining method, the method of using spot welding, the method of using bolts, rivets, etc., and other methods may also be employed.

In addition, in the second embodiment, as explained above, the panel member 70 extends along a plane perpendicular to the front-rear direction of the body. However, it does not necessarily have to extend along this plane. It may also extend along a plane inclined with respect to this plane.

Further, the present embodiments were explained assuming the front compartment mounted a motor or engine or other power unit, but the invention is not limited to this. It may also be used as a luggage compartment etc.

Further, the front body structure according to the present invention can of course be applied to not only an automobile which mounts an internal combustion engine, but also a hybrid vehicle or an electric vehicle in which motors are provided at the wheels etc. Note that, in the above-mentioned electric vehicle etc., since there is no need to mount a large sized engine in the front chamber, the first reinforcing member and the second reinforcing member can be reliably arranged.

Further, the shape of the body as a whole is not limited to the one disclosed in FIG. 1 and FIG. 4. It may also be made a station wagon type, minivan type, SUV type, or other shape.

EXAMPLES

Figure 8:
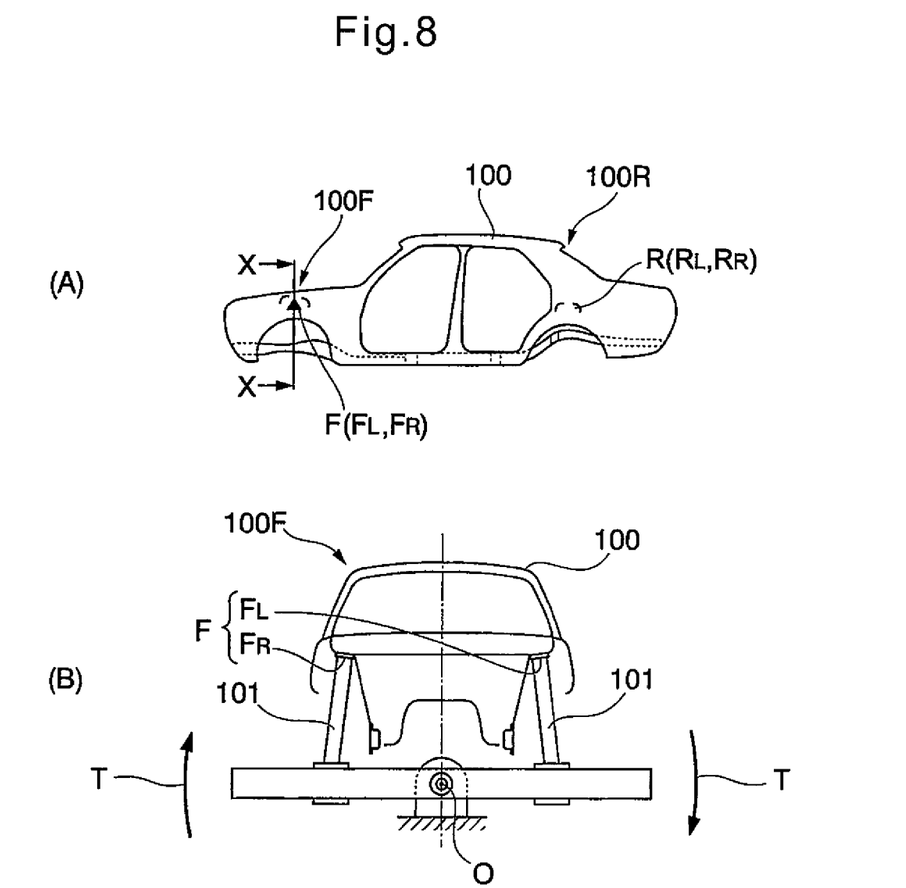
FIG. 8 give schematic views which show one example of a method of measurement of the torsional stiffness of a body, wherein (A) shows a position of application of a load in a longitudinal direction of the body structure, while (B) is a view seen along a line X-X in (A) and shows an outline of generation of a torque in a width direction of the body.
Figure 9:
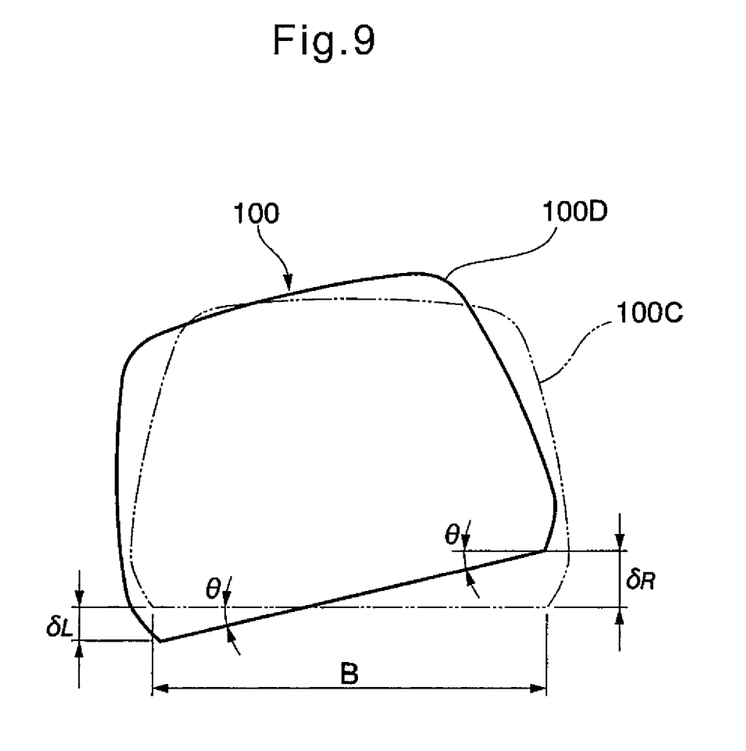
FIG. 9 is a view which shows displacement and the torsional angle of a body before and after application of a torsional torque as seen from line X-X of FIG. 8(A).
Figure 10:
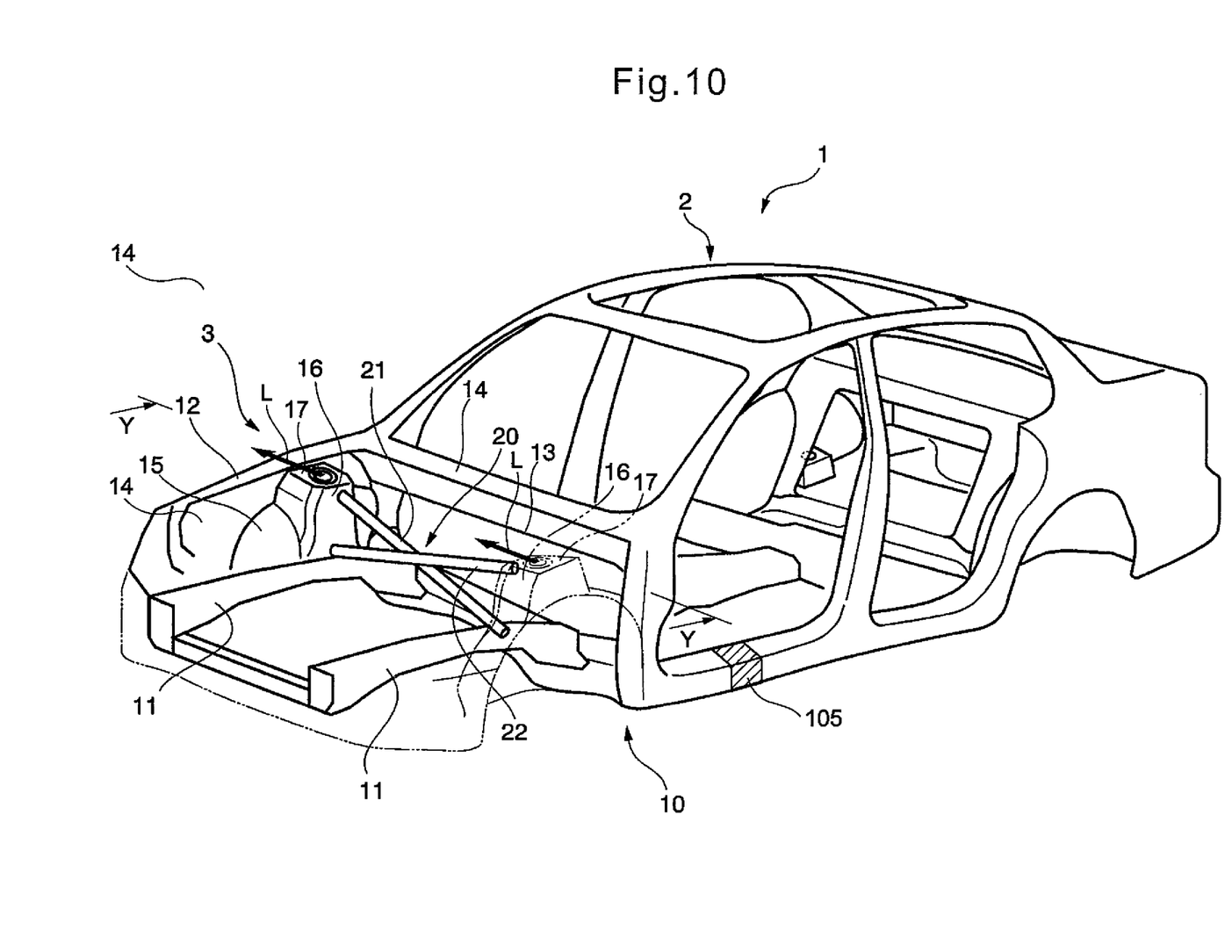
FIG. 10 is a schematic view which shows one example of a method of measurement and calculation of a lateral bending stiffness of the body.

Here, to confirm the effect on the present embodiment, for example, the technique which is shown in FIG. 8 and FIG. 9 was used to calculate the torsional stiffness, while the technique which is shown in FIG. 10 was used to calculate the lateral bending stiffness.

Below, first, referring to FIG. 8 and FIG. 9, the method of measurement and calculation of the torsional stiffness will be explained. FIG. 8 is a conceptual view which shows the method of measurement and calculation of the torsional stiffness of the body-in-white (body) 100, while FIG. 9 is a view for explaining the torsional stiffness based on the torsion of the front axle position 100F (position in front-rear direction of body at which front shaft is arranged) based on the rear axle position 100R (position in front-rear direction of body at which rear shaft is arranged).

To measure the torsional stiffness, for example, as shown in FIG. 8(A), the body-in-white 100 is fastened at the rear axle position 100R and the average specific torsional stiffness GJ which is obtained by application of the torsional torque at the front axle position 100F is used for evaluation (G: modulus of rigidity, J: polar moment of inertia of area).

Specifically, at the rear axle position 100R, the body-in-white 100 is fastened (for example, the suspension setting parts $R_L$ and $R_R$ of the rear strut towers are fastened) and the top ends of dummy bars 101 are attached to the suspension setting parts $F_L$ and $F_R$ of the front strut towers. In this state, a seesaw table 102 to which the bottom ends of the dummy bars 101 are attached is turned about the axis O. Due to this, a torsional torque T is applied to the suspension setting parts $F_L$ and $F_R$ of the front strut towers (see FIG. 8(B)).

FIG. 9 is a view which shows the body cross-section at the front axle position 100F seen from the line X-X of FIG. 8(A). The specific torsional stiffness GJ is calculated based on the left and right displacements $\delta_L$ and $\delta_R$ of the body which occur at the front axle position 100F at the time of application of the above torsional torque T. Note that, in FIG. 9, 100C which is shown by the two-dot chain line and 100D which is shown by the solid line show the body (outside shape) before and after application of the torsional torque T.

Here, since the torsion angle θ(rad) due to the torsional torque T is small, it can be approximated as θ≈ tan θ=(($\delta_L$+ $\delta_R$)/B); (B is body width dimension relating to application of torsional torque T at front axle position 100F).

Specific Torsional stiffness $GJ=(T/(\delta/\text{wheelbase length } L))=(T \cdot B \cdot \text{wheelbase length } L)/(\delta_L+\delta_R)$ (For example, see "Strength of Automobiles", Sankaido, Oct. 30, 1990, second edition)

Figure 11:
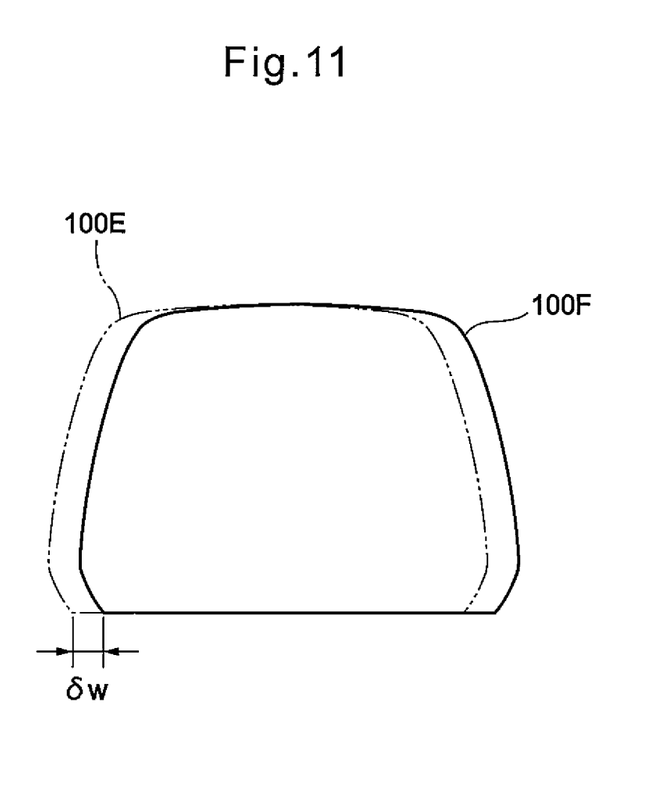
FIG. 11 is a view which shows displacement of the body before and after application of the load in the width direction as seen from the line Y-Y of FIG. 10.

Next, referring to FIG. 10 and FIG. 11, the method of measurement and calculation of the lateral bending stiffness will be explained. FIG. 10 is a conceptual view which shows the method of measurement of the lateral bending stiffness of the body-in-white 100, while FIG. 11 is a view for explaining the lateral bending stiffness based on displacement in the width direction at the front axle position 100F. As shown in FIG. 10, when measuring the lateral bending stiffness, instead of the rear axle position 100R, the body is fastened at the side sill intermediate parts 105.

Further, in the same way as FIG. 8(B), the top ends of dummy bars 101 are attached to the suspension setting parts $F_L$ and $F_R$ of the front strut towers. In this state, a seesaw table 102 to which the bottom ends of the dummy bars 101 and 101 are attached is moveed in the vehicle width direction and due to this, a width direction load L is applied to the suspension setting parts $F_L$ and $F_R$ of the front strut towers.

FIG. 11 is a view which shows the body cross-section at the front axle position 100F seen from the line Y-Y of FIG. 10. The value of the lateral bending stiffness is calculated based on the displacement δw in the width direction of the body occurring at the front axle position 100F when applying the load L in the width direction. Note that, in FIG. 11, 100E which is shown by the two-dot chain line and 100F which is shown by the solid line show the body (outside shape) before and after application of the width direction load L. In this case, the lateral bending stiffness is expressed as follows:

Lateral bending stiffness=Input load $L$/load point displacement $\delta_W$

In this example, as the conventional example, a model where the first reinforcing member and second reinforcing member and the panel member were not arranged was used. As an invention example, as shown in the first embodiment, a model where a first reinforcing member and second reinforcing member are arranged was used. Note that the first reinforcing member and second reinforcing member were steel pipes having outside diameter of 20 mm and thickness of 2 mm.

The above measurement and calculation method was used to calculate the torsional stiffness and the lateral bending stiffness. As a result, in the invention example, it was confirmed that the torsional stiffness is improved 5.49% and the lateral bending stiffness is improved 26% compared with the conventional example.

INDUSTRIAL APPLICABILITY

By improving the torsional stiffness and lateral bending stiffness of the body structure of an automobile, it is possible to improve the stability while the automobile is being driven, so there is great industrial applicability.

REFERENCE SIGNS LIST

1, 51 body
2, 52 passenger compartment
3, 53 front compartment
10, 60 front body structure
11 front side member
16 strut tower
20 reinforcing member
21 first reinforcing member
22 second reinforcing member
70 panel member
75 reinforcing bead

The invention claimed is:
1. A front body structure in a body which has a front compartment which is arranged at a front side of a passenger compartment, comprising:
  a pair of front side members which are positioned at an inside of said front chamber and extend in a front-rear direction of said body;

a pair of strut towers which are arranged inside of said front compartment at both sides of a width direction of said front compartment, and at an inside of the strut towers suspensions for front wheel are arranged; and a reinforcing member which is directly connected to a top part of said strut tower and to a front side member of the pair of front side members which faces said strut tower, and which reinforcing member extends in a straight line between the top part and the front side member, wherein said reinforcing member comprises a first reinforcing member which is directly connected to a top part of a strut tower of one side in the width direction and a front side member of the other side in the width direction and extends in a straight line between these top part and front side member and a second reinforcing member which is directly connected to a top part of a strut tower of the other side in the width direction and a front side member of the one side in the width direction and extends in a straight line between these top part and front side member.

2. The front body structure as set forth in claim 1 wherein said reinforcing member extends along a plane perpendicular to the front-rear direction of the body.

3. The front body structure as set forth in claim 1 or 2 wherein said reinforcing member is comprised of a solid rod member.

\* \* \* \* \*

UNITED STATES PATENT AND TRADEMARK OFFICE
CERTIFICATE OF CORRECTION

PATENT NO. : 8,979,104 B2  
APPLICATION NO. : 14/004702  
DATED : March 17, 2015  
INVENTOR(S) : Toshiyuki Niwa et al.

It is certified that error appears in the above-identified patent and that said Letters Patent is hereby corrected as shown below:

In the specification

Column 9, line 57, change "Specific Torsional stiffness $GJ = (T/(\delta/\text{wheelbase length } L)) = (T \cdot B \cdot \text{wheelbase length } L)/(\delta_L + \delta_R)$" to -- Specific Torsional stiffness $GJ = (T/(\theta/\text{wheelbase length } L)) = (T \cdot B \cdot \text{wheelbase length } L)/(\delta_L + \delta_R)$ --.

Signed and Sealed this
Twenty-ninth Day of December, 2015

Michelle K. Lee
*Director of the United States Patent and Trademark Office*